United States Patent [19]

Jentsch

[11] 3,901,359

[45] Aug. 26, 1975

[54] HYDRAULIC TWIN-TUBE VIBRATION DAMPER

[75] Inventor: Erwin Jentsch, Bischofsheim, Germany

[73] Assignee: General Motors Corporation, Detroit, Mich.

[22] Filed: Apr. 17, 1974

[21] Appl. No.: 461,500

[30] Foreign Application Priority Data

July 25, 1973 Germany.............................. 2337665

[52] U.S. Cl. ................ 188/269; 188/315; 188/267; 188/64 R
[51] Int. Cl.²........................ F16F 9/06; F16F 9/40
[58] Field of Search ...... 188/269, 298, 315; 267/35, 267/64 R

[56] References Cited
UNITED STATES PATENTS

| 2,987,311 | 6/1961 | Schilling et al. | 267/64 R |
| 3,123,347 | 3/1964 | Stormer et al. | 267/64 R X |

FOREIGN PATENTS OR APPLICATIONS

| 1,114,813 | 12/1955 | France | 188/315 |
| 1,270,261 | 7/1961 | France | 267/64 R |

Primary Examiner—George E. A. Halvosa
Attorney, Agent, or Firm—C. R. White

[57] ABSTRACT

A hydraulic twin-tube vibration damper, particularly for motor vehicles, which has an annular compensating space surrounding the damper cylinder and connected to the damper cylinder by way of a compensating valve, has a resilient pressure cushion in the compensating space in the form of gas-filled flexible tubing arranged in a helical configuration around the damper cylinder, the coils of the helix being spaced apart from one another and having a diameter substantially corresponding to the radial distance between the inner and outer walls of the compensating space.

The ends of the tubing are closed by welding, the end regions of the tubing being folded over and held by clamping rings secured to the respective ends of the damper cylinder. The tubing is either seamless in its longitudinal direction or it has a continuous longitudinal seam. Cross-welds spaced at intervals along the length of the tubing subdivide it into several tandem-arranged pressure-cushion spaces.

6 Claims, 7 Drawing Figures

HYDRAULIC TWIN-TUBE VIBRATION DAMPER

This invention relates to a hydraulic twin-tube vibration damper, particularly for motor vehicles.

In a hydraulic twin-tube vibration damper, a piston provided with damping means, generally in the form of through apertures provided with one-way valves, is slidably mounted in a fluid-filled damper cylinder for reciprocation therein by means of a piston rod which projects out of one end of the damper cylinder. An annular compensating space or reservoir chamber coaxially surrounds the damper cylinder and is fluidly connected to the damper cylinder by way of a double-acting compensating valve or base value.

During operation of the damper, to compensate for the change in the effective volume of the damper cylinder as the piston rod passes in and out, fluid from the damper cylinder is displaced via the compensating valve into the compensating space, and vice versa. Thereby, the spaces in the damper cylinder on both sides of the piston can remain filled with damping fluid.

The reciprocatory flow of fluid between the damper cylinder and the compensating space during operation of the damper tends to produce frothing or foaming of the fluid in the compensating space, and can even produce knocking noises due to cavitation effects under excessively heavy duty conditions. To avoid such disadvantageous operation, it is possible to include one or more gas-filled pressure cushions in the compensating space. These cushions always keep the damping fluid in the compensating space at a pressure which is higher than that of the surrounding atmosphere and ensure that the free volume of the compensating space (namely the part of the space unoccupied by the pressure cushion or cushions) is always completely filled with fluid, to provide a damper without a free fluid surface.

An object of the invention is to permit adequate dissipation of heat, and so avoid undue build-up of heat, in such a twin-tube damper without a free fluid surface.

A further object of the invention is to avoid undue stressing of the pressure cushions in the confined space available in the compensating space, on the basis that if the pressure cushions cannot conform to their natural shape, there is a likelihood of premature failure of welded joints of the cushions, leading to inefficient operation of the damper.

Another object of the invention is to provide a vibration damper of the above-identified kind, namely a twin-tube damper without a free fluid surface, which will ensure a long working life for the pressure cushion and will moreover guarantee efficient dissipation of heat from the damper.

The basic concept of the present invention, which allows the objects to be achieved in a surprisingly simple and favourable manner, is that the flexible tubing serving as a pressure cushion is arranged in a helical configuration around the damper cylinder.

By the use of a hydraulic twin-tube vibration damper in accordance with the present invention, the fluid in the compensating space may be maintained at superatmospheric pressure without a free fluid surface and without impairment of the dissipation of heat in a radially outward direction. Furthermore, due to the helical disposition of the pressure cushion in the compensating space of a damper in accordance with the invention, the damping fluid, as it flows through the compensating valve into the compensating space and then in the reverse direction back into the damper cylinder, is constrained to move with a rotary component of movement, such that any gas bubbles present in the fluid are caused to move in a radially outward direction. This is due to the helically arranged flexible tubing acting as a spiral baffle in modifying the direction of flow of the damper fluid.

Due to the hose-form construction of the pressure cushion in a twin-tube vibration damper in accordance with the present invention — with the diameter of the pressure cushion preferably corresponding substantially to the radial distance between the inner and outer walls of the compensating space, as well as the coils of the helix being spaced apart from one another — it is possible to attain an appreciable shortening of the welded end joints and a reduction in their stressing. Hence an arrangement in accordance with the invention ensures stability of the damper over a long working life.

A further proposal in accordance with the invention is to make the flexible tubing seamless in its longitudinal direction. Alternatively, with matching of the diameter of the tubing to the radial dimensions of the equalising chamber, it is possible for the tubing to have a continuous seam in the longitudinal direction, without the likelihood of excessive stressing of this seam.

Another proposal in accordance with the invention is for the extremities of the flexible tubing to be welded closed after the tubing has been filled with gas, for example air, and for these extremities to be connected to respective ends of the damper cylinder. Preferably the welded extremities of the tubing are folded over and secured to respective clamping rings connected to the two ends of the damper cylinder. This is advantageous in permitting satisfactory fixing of the flexible tubing in the compensating space, this mode of clamping resulting in reduced stressing of the welded end joints, which are comparatively sensitive.

A particularly advantageous construction in accordance with the invention is one in which the flexible tubing is subdivided into several tandem-arranged pressure cushion spaces by means of cross-welds spaced at intervals along the length of the tubing. This subdivision of the flexible tubing into a number of smaller gas spaces by various intermediate welds has the advantage that, in the event of a defect developing in the tubing, only a single gas cell will leak rather than the entire pressure cushion becoming ineffective.

Figure 1:
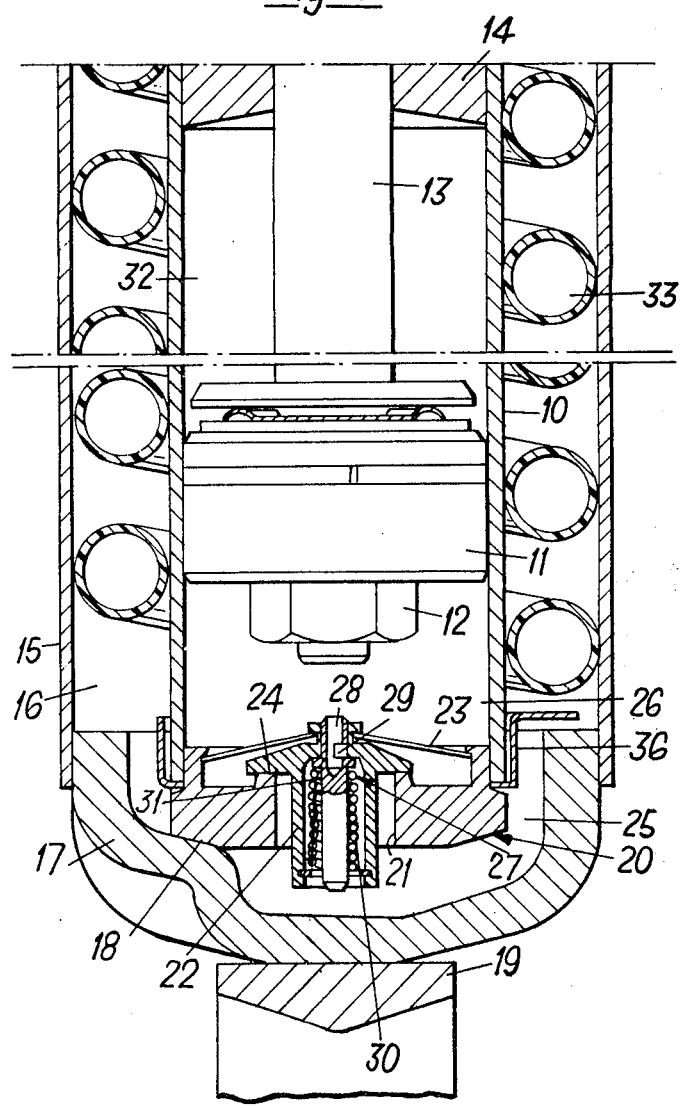
FIG. 1 is a fragmentary longitudinal section of a preferred embodiment of a hydraulic vibration damper in accordance with the present invention.

As is shown in FIG. 1 of the drawings, a hydraulic twin-tube vibration damper in accordance with the invention includes a damper cylinder 10 in which a damper piston 11 is slidably mounted for reciprocatory movement in an axial direction. The damper piston 11 is secured by means of a nut 12 to a piston rod 13 the upper end (not shown) of which is connected to a sprung structural part, for example the superstructure of a motor vehicle. In a manner known per se, and therefore not indicated in greater detail, the piston rod 13 extends with a sliding fit through a sealing and guide member 14 which forms a closure for the upper end (not shown) of the damper cylinder 10. The damper piston 11 is formed in well-known manner with several restricted through apertures (not shown) which are closed by the usual one-way valves, permitting a throttled flow of hydraulic damping fluid, present on both sides of the damper piston 11 in the damper cylinder 10, during the reciprocatory movement of the damper piston and thereby providing the required damping of vibratory movement of the structural part to which the piston rod 13 is connected.

An annular compensating space 16, which like the damper cylinder 10 is filled with hydraulic damping fluid, concentrically surrounds the damper cylinder 10, and is bounded in the radially outward direction by a tubular outer casing 15 of the damper. An end cap 17, which serves at the same time as an axial stop for the damper cylinder 10 at 18, is connected to the outer casing 15 to close off the lower end of the compensating space 16. A bearing eye 19 is secured to the cap 17 to allow the vibration damper to be connected to an unsprung structural part, for example an axle of a motor vehicle.

The lower end of the damper cylinder 10 is closed off by a compensating or base valve 20. This valve has a central aperture 21 in which a valve member 22 is arranged and is held in contact with an annular valve seat 24 by means of a plate spring 23. This plate spring 23 is relatively weak, and offers very slight resistance against lifting of the valve member 22 from its seat 24, thereby allowing relatively unthrottled flow of damper fluid out of the compensating space 16 via a connecting passage 25 into a part 26 of the working space in the damper cylinder 10. To facilitate such flow the plate spring 23 is provided with through apertures, which however are not shown in FIG. 1 for simplicity.

The valve member 22 carries a non-return valve 27 having an axial bore 28 which is in communication with a radial cavity 29. This non-return valve 27 is held on a valve seat 31 by a compression spring 30, with a pressure which is somewhat greater than the fluid pressure required in the part 26 of the working space for opening the valves in the damper piston 11 during its downward movement. Consequently, during normal operation of the vibration damper, downward movement of the damper piston 11 results in a flow of damping fluid from the part 26 of the working space through the throttling bores into a part 32 of the working space, disposed above the damper piston 11. The non-return valve 27 opens when, and only when, the pressure in the part 26 of the working space increases to a value greater than is necessary for opening the valves in the damper piston 11, whereupon damping fluid can flow from the part 26 of the working space into the compensating space 16 to provide volume equalisation for the fluid displaced from the part 32 of the working space by the piston rod 13.

Conversely, during upward movement of the damper piston 11 from its FIG. 1 position, fluid passes from the part 32 of the working space through the throttling bores in the damper piston 11 into the part 26 of the working space. The extra free volume of the working space as the piston rod is progressively withdrawn from the part 32 of the working space is compensated for by opening of the valve 22, which permits practically unthrottled return flow of fluid from the compensating space 16 into the part 26 of the working space in the damper cylinder. The compensating valve 20 thus forms a controlled fluid connection between the damper cylinder and the compensating space.

Thus during operation of the damper, damping fluid flows continuously to and fro between the part 26 of the working space and the compensating space 16. In order to prevent frothing and possible cavitation of the damping fluid, the compensating space 16 contains a length of flexible tubing 33 filled with air or another suitable gas which is arranged in a helical configuration around the damper cylinder 10, with the coils of the helix spaced apart from one another and having a diameter substantially corresponding to the radial distance between the inner and outer walls of the compensating space. This allows the fluid in the compensating space 16 to be kept constantly at superatmospheric pressure. Because of the axial spacing between adjacent coils or convolutions of the helically arranged flexible tubing 33, adequate dissipation of excess heat from the damper to its surroundings is provided. Moreover, due to the helical convolutions of the flexible tubing 33, which act like a spiral baffle, the fluid is set into rotation, so that individual gas bubbles are driven outwardly by centrifugal force and are unable to pass into the part 26 of the working space in the damper cylinder.

Figure 2:
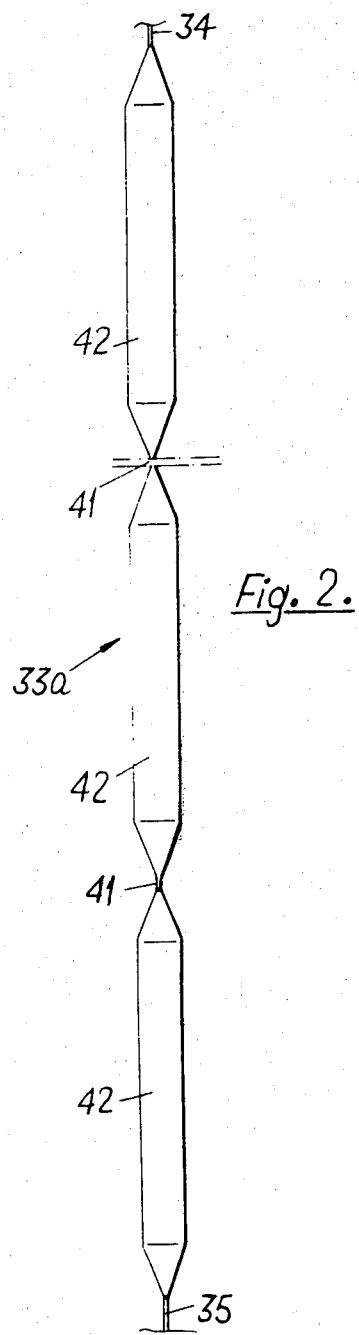
FIG. 2 illustrates (shown extended) one possible form of a hose-like pressure cushion, made of flexible tubing, in conformity with the invention.

As will be seen particularly from FIG. 2, the two ends 34 and 35 of the flexible tubing 33 are closed off by respective welded seams, and are fixed to the two ends of the damper cylinder 10 by clamping rings. In FIG. 1 such a clamping ring, designated 36, is secured between the lower end of the damper cylinder 10 and the compensating valve 20.

Figure 3:
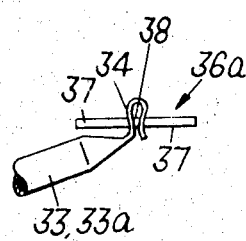
FIG. 3 shows, in elevation, a ring for clamping one welded extremity of flexible tubing forming a pressure cushion in conformity with the invention.
Figure 4:
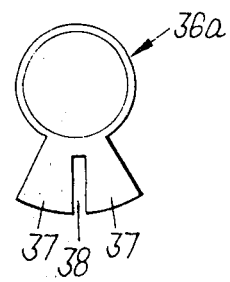
FIG. 4 is a plan view of the clamping ring shown in FIG. 3.
Figure 5:
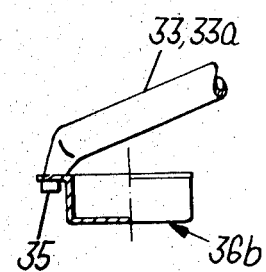
FIG. 5 is a view similar to FIG. 3 but showing another embodiment of a clamping ring for one welded extremity of flexible tubing forming a pressure cushion in conformity with the invention.
Figure 6:
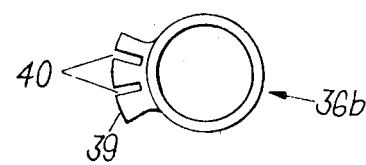
FIG. 6 is a plan view of the clamping ring shown in FIG. 5.
Figure 7:
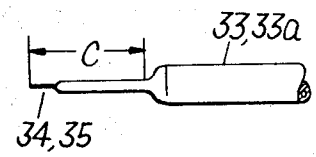
FIG. 7 shows an extremity of the flexible tubing shaped for the clamping.

FIGS. 3 and 4, and 5 and 6, respectively illustrate two embodiments 36a and 36b of the clamping rings, involving different methods of attachment of the ends 34 and 35 of the flexible tubing. In the embodiment which is shown in FIGS. 3 and 4, the clamping ring 36a is provided with two lugs 37 between which there is a slot 38, and the welded end 34 of the flexible tubing is folded over to form a loop and is jammed in the slot. In the embodiment which is shown in FIGS. 5 and 6, the clamping ring 36b is provided with three lugs 39 and two slots 40 into which the end 35 of the flexible tubing is jammed. In FIG. 7 the length of the end of the flexible tubing which is required for attachment to the clamping ring 36a or 36b is designated by C. An advantage of clamping the ends of the flexible tubing in the manner described is that it reduces stresses on the welded seams at the ends of the tubing.

In the embodiment of the vibration damper which is shown in FIG. 1, the flexible tubing 33 is constructed to provide throughout its length a single continuous volume of pressure-gas, whereas in the embodiment of the flexible tubing 33a which is shown in FIG. 2 the flexible tubing is subdivided by several cross-welds 41 into a number of individual pressure-cushion spaces 42 which are connected together by their boundary walls, by way of the adequately strong cross-welds 41, but are not in gaseous communication with each other. Should a single pressure cushion space 42 begin to leak during operation of the damper, the remaining pressure cushion spaces of the flexible tubing 33a are still able to fulfil their function, such that the entire damper remains operational.

I claim:

1. A hydraulic vibration damper unit comprising a damper cylinder, a piston slidably mounted in said damper cylinder, a piston rod secured to said piston and projecting out of said damper cylinder for effecting reciprocatory movement of the piston, damping means carried by said piston, an annular compensating space coaxially surrounding said damper cylinder, a compensating valve operatively connected between said damper cylinder and said compensating space, a resilient pressure cushion arranged in said compensating space and comprising a gas-filled flexible tube, said tube being arranged in a helical configuration in said compensating space around the damper cylinder, a hydraulic fluid filling said compensating space around the tubing and filling said damper cylinder, and spaced clamping means secured in said unit to the ends of said damper cylinder and operatively connected to the ends of said tube for supporting said tube in said compensating space and spacing the convolutions of said tubing from each other.

2. A hydraulic twin-tube vibration damper unit comprising a damper cylinder, a piston slidably mounted in said damper cylinder, a piston rod secured to said piston and projecting out of said damper cylinder for effecting reciprocatory movement of said piston, damping means carried by said piston, an outer cylinder spaced from said damper cylinder, an annular compensating space coaxially surrounding said damper cylinder formed between said outer cylinder and said damper cylinder, a compensating valve forming a hydraulic connection between said damper cylinder and said compensating space, a resilient pressure cushion arranged in said compensating space and comprising gas-filled flexible tubing which is arranged in a helical configuration around the damper cylinder with the coils of the helix spaced apart from one another, said flexible tubing having a diameter substantially corresponding to the radial distance between the inner and outer walls of said cylinders forming said compensating space, a hydraulic damping fluid filling said compensating space around said flexible tubing and filling said damper cylinder, and spaced clamping means supported by opposite end portions of the damper cylinder for clamping engagement with the ends of tubing for supporting said tubing in said compensating space.

3. A hydraulic twin-tube vibration damper unit comprising a damper cylinder, a damping piston slidably mounted in said damper cylinder for reciprocatory movement therein, a piston rod secured to the piston, an annular compensating space coaxially surrounding said damper cylinder, a compensating valve forming a controlled fluid connection between said damper cylinder and said compensating space, a resilient pressure cushion arranged in the compensating space and comprising cylindrical gas-filled flexible tubing, said tubing having a plurality of coils disposed around said damper cylinder, said coils being spaced apart from one another, spaced clamping means secured in said damper unit operatively clamping opposite ends of said flexible tubing to support said tubing in said compensating space, each of said spaced clamping means comprising a clamping ring secured to said damper cylinder, and each clamping ring having a radially extending fastener lug extending into said compensating space for attachment to one of the ends of said flexible tubing.

4. A hydraulic twin-tube vibration damper comprising: a damper cylinder, a damping piston slidably mounted in the damper cylinder for reciprocatory movement therein, a piston rod secured to said piston, an annular compensating space coaxially surrounding the damper cylinder and having an inner wall formed by the damper cylinder and an outer wall forming a tubular outer casing of said damper, a compensating valve forming a controlled fluid connection between said damper cylinder and said compensating space, a resilient pressure cushion arranged in said compensating space and comprising gas-filled flexible tubing, said tubing being arranged in a helical configuration around the damper cylinder with the coils of the helix spaced apart from one another, said tubing having a diameter substantially corresponding to the radical distance between the inner and outer walls of the compensating space, a hydraulic damping fluid completely filling the free volume of the compensating space and the damper cylinder, and spaced clamping means secured to said damper cylinder for clamping the ends of said tubing and for supporting said tubing in said compensating space.

5. A hydraulic twin-tube vibration damper comprising a damper cylinder, a damping piston slidably mounted in said damper cylinder for reciprocatory movement therein, a piston rod secured to said piston, an outer cylinder, an annular compensating space formed between said damper cylinder and said outer cylinder and coaxially surrounding the damper cylinder, a compensating valve forming a controlled fluid connection between said damper cylinder and said compensating space, a helical resilient pressure cushion arranged in said compensating space and comprising gas-filled flexible tubing, said tubing having flattened end portions closed by welded seams, said tubing being subdivided into a plurality of tandem arranged pressure-cushion spaces by cross-welds spaced at intervals along the length of the tubing, hydraulic damping fluid completely filling the free volume of said compensating space and said damper cylinder, and spaced clamping ring means rigidly secured in said damper for supporting said tubing in said compensating space, and said clamping means having radially extending lug means forming a slot therebetween for receiving and holding the flattened end portions of said flexible tubing.

6. A hydraulic twin-tube vibration damper comprising a damper cylinder, a piston slidably mounted in said damper cylinder, a piston rod secured to the piston and projecting out of said damper cylinder for effecting reciprocatory movement of said piston within said damper cylinder, damping means carried by said piston, an annular compensating space coaxially surrounding said damper cylinder, a compensating valve forming a controlled fluid connection between said damper cylinder and said compensating space, a resilient pressure cushion arranged in said compensating space and comprising gas-filled flexible tubing closed off at its ends by welded seams, a pair of clamping rings for supporting said flexible tubing in said compensating space, each of said clamping rings having a body portion secured to said damper cylinder and having spaced lugs extending radially from said body portion, said spaced lugs forming slot means therebetween into which end portions of said flexible tubing are secured, means connecting said body portions of said rings to respective end portions of said damper cylinder, and hydraulic damping fluid means completely filling the free volume of the compensating space and said damper cylinder.

* * * * *